Figure 1:
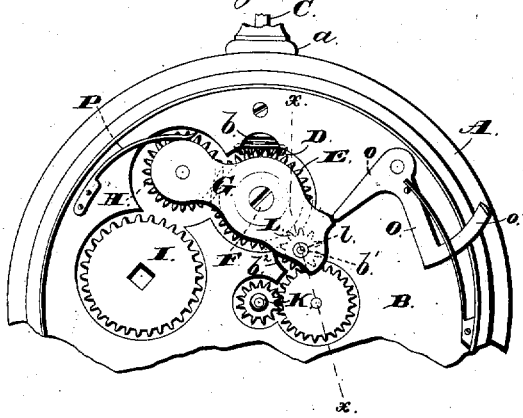

D. H. CHURCH.

Assignor, by mesne assignments, to R. E. ROBBINS and T. M. AVERY, trustees.

STEM WINDING AND SETTING WATCH.

No. 10,580. Reissued Apr. 14, 1885.

Witnesses
Jas. E. Hutchinson.
Henry C. Hazard

Inventor.
D. H. Church, by
Prindle and Russell, his Attys

UNITED STATES PATENT OFFICE.

DUANE H. CHURCH, OF WALTHAM, MASSACHUSETTS, ASSIGNOR, BY MESNE ASSIGNMENTS, TO ROYAL E. ROBBINS, OF BOSTON, MASSACHUSETTS, AND THOMAS M. AVERY, OF CHICAGO, ILLINOIS, TRUSTEES.

STEM WINDING AND SETTING WATCH.

SPECIFICATION forming part of Reissued Letters Patent No. 10,580, dated April 14, 1885.

Original No. 295,484, dated March 18, 1884. Application for reissue filed March 14, 1885.

*To all whom it may concern:*

Be it known that I, DUANE H. CHURCH, of Waltham, in the county of Middlesex, State of Massachusetts, did invent certain new and useful Improvements in Stem Winding and Setting Watches, for which Letters Patent of the United States were issued upon the 18th day of March, 1884, which Letters Patent have been found to be defective and invalid, and not to cover the invention set forth in the specification and shown in the drawings, which were filed in the Patent Office upon the 23d day of August, 1883, preparatory to the obtaining of the said Letters Patent. Now, therefore, being desirous of reissuing the said Letters Patent, I have prepared and do hereby declare the following to be a full, clear, and exact description of the said improvements, reference being had to the accompanying drawings, in which—

Figure 2:
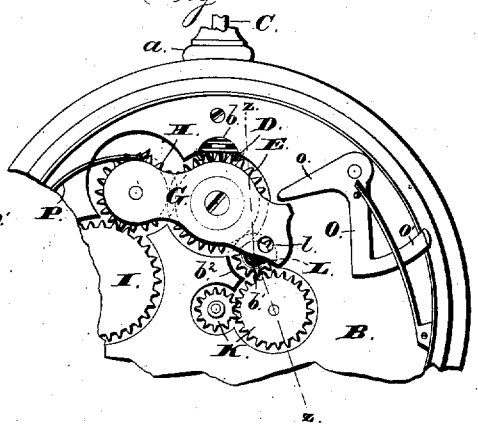
Figure 3:
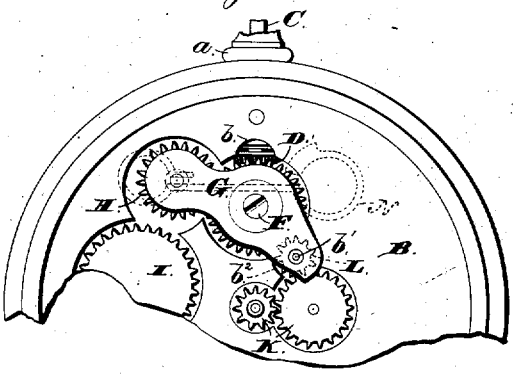
Figure 4:
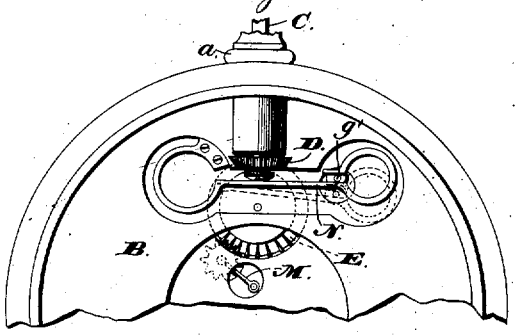
Figure 5:
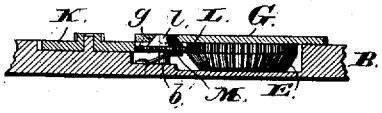
Figure 6:
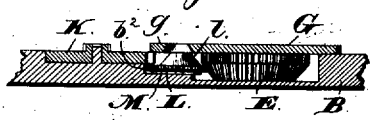

Figure 1 is a plan view of a portion of a watch containing my improvements, the dial being removed and the stem-driven mechanism in position for setting the hands. Fig. 2 is a like view of the same with said stem-driven mechanism in position for winding the spring. Figs. 3 and 4 are plan views of opposite sides of said watch, and show the winding and hands-setting mechanism arranged to be manipulated entirely by the stem-arbor; and Figs. 5 and 6 are sections upon lines *x x* and *z z*, respectively, of Figs. 1 and 2.

Letters of like name and kind refer to like parts in each of the figures.

This invention relates to a stem winding and setting watch in which connection is made between the stem-driven train and the dial-wheels by means of an intermediate wheel that is shifted into or out of engagement therewith in a direction perpendicular to its plane of rotation; and the object of said invention is to cause such operation to be performed by or in consequence of the movements of the pivoted yoke as it moves said train into or out of engagement with the winding-wheel.

To this end my said invention consists, principally, as an improvement in stem winding and setting watches, in combining with the dial-wheels and with a stem-driven train which is provided with a pivoted yoke, an intermediate wheel which is adapted to connect or to disconnect said dial-wheels and train, and by the movement of said yoke is shifted in a line perpendicular to its plane of rotation, substantially as and for the purpose hereinafter specified.

It consists, further, as an improvement in stem winding and setting watches, in combining with the dial-wheels and with a stem-driven train which is provided with a pivoted yoke an intermediate wheel that is shiftable in a line perpendicular to its plane of rotation, and by the movement of said yoke is permitted to engage with or is disengaged from said dial-wheels and train, substantially as and for the purpose hereinafter shown.

It consists, further, as an improvement in stem winding and setting watches, in combining with the dial-wheels and with a stem-driven train, which is provided with a pivoted yoke, an intermediate wheel that by the action of a spring is shifted in a line perpendicular to its plane of rotation into engagement with said dial-wheels and train, and by the motion of said yoke is shifted in the same line out of engagement with said parts, substantially as and for the purpose hereinafter set forth.

It consists, finally, as an improvement in stem winding and setting watches, in a stem-driven train which is in part journaled upon a pivoted yoke, and an intermediate wheel that by the movements of said yoke and the action of a spring is shiftable in a line perpendicular to its plane of rotation, said parts being combined and arranged to operate in the order shown, whereby as said train is engaged with the spring-wheel it is automatically disengaged from the dial-wheels, and when engaged with said dial-wheels it is by the same operation disengaged from said winding-wheel, substantially as and for the purpose hereinafter shown and described.

In the annexed drawings, A represents a portion of the center band of a watch-case having a pendant, *a*, and B the upper plate of a watch-movement, which plate is fitted to and secured within said case in the usual manner.

Journaled within the pendant *a* is a stem-arbor, C, which at its inner end enters into and engages with a pinion, D, that is journaled in a suitable bearing upon the lower face of the plate B, and has its toothed periphery extending through an opening, *b*, which is provided in said plate, where it meshes with a toothed wheel, E, that is journaled upon the latter by means of a screw, F, the arrangement being such as to enable said wheel E to be rotated in either direction by the rotation of said stem-arbor.

Upon the upper end of the screw F is pivoted a yoke, G, which has the usual form in plan view, and has pivoted upon its lower face at one end a toothed wheel, H, that meshes with the wheel E, and by the movement of said yoke upon its pivotal bearing may be moved into or out of engagement with a wheel, I, that is attached to the mainspring-arbor, all in the usual manner, and for the purpose of enabling the mainspring to be wound by the rotation of the stem-arbor C.

The watch-movement is provided with the usual dial-wheels, K, and between one of the same and the wheel E is placed an intermediate wheel, L, that has such diameter as to enable it to mesh with and connect said wheels. Said wheel L is journaled upon a stud, *b'*, that projects upward from the plate B, and around said stud is formed a recess, *b²*, which has such diameter and depth as to enable said wheel L to be moved downward in a line perpendicular to its plane of rotation a distance sufficient to disengage it from the dial-wheel K. Said wheel E has preferably such depth as to cause said intermediate wheel to remain in engagement therewith whether in or out of engagement with said dial-wheel.

The intermediate wheel, L, is held with a yielding pressure at the upper limit of its motion in engagement with the dial-wheel K by means of a spring, M, placed beneath, and is moved to the lower limit of its motion out of engagement with said dial-wheel by the movement of the yoke G upon its pivotal bearing, such last named operation being effected as follows, viz: The stud *b'* has such length as to permit the yoke G to swing freely over its upper end, while the intermediate wheel, L, has its upper side, *l*, constructed in the form of a cone, the apex of which bears against the lower face of said yoke and is held in engagement therewith by the spring M, in which position said yoke operates to hold said wheel at the lower limit of its motion out of engagement with the dial-wheel.

Within the yoke G is formed a recess, *g*, which, when said part is turned to the position shown in Figs. 1 and 5, so as to disengage the stem-driven train from the winding-wheel I, comes directly over the axis of the intermediate wheel, L, and permits the latter to be raised by the spring M into the plane of the dial-wheel K with its conical upper side, *l*, projecting upward into said recess, while when said yoke is moved in an opposite direction, so as to cause said train to engage with said winding-wheel, the side of said recess moves over the inclined face of said conical part *l* and forces said wheel L downward out of engagement with said dial-wheel, such movements of said intermediate wheel automatically resulting from the oscillations of said yoke.

The yoke G may be shifted from one position to another by means of the longitudinal movement of the stem-arbor C, in which event a spring, N, is secured to the lower face of the plate B and caused to engage with a stud, *g'*, which extends from the winding-wheel end of said yoke downward through an opening in said plate, the arrangement of said spring being such as to cause it to hold said yoke in position to enable the hands of the watch to be set, except when, by an inward movement of said stem-arbor, communicated to the outer side of said spring N, the outward pressure of the latter is neutralized and it is moved in the same direction sufficiently to change the position of said yoke and cause the stem-driven train to engage with said winding-wheel I. Upon drawing said stem-arbor outward again, said spring N is permitted to act and immediately restores said yoke to its former position with the said train in engagement with the dial-wheel.

When the stem-arbor is not longitudinally movable, the yoke G may be turned to position to cause the stem-driven train to engage with the winding-wheel I by means of a Z-shaped lever, O, which, as shown in Figs. 1 and 2, is pivoted upon the plate B in position to enable the end of one of its arms, *o*, to engage with the end of said yoke adjacent to the intermediate wheel, L, and move the same inward whenever the opposite arm, *o'*, of said lever is drawn outward from beneath the bezel of the case, as seen in Fig. 1. When said lever is disengaged from said yoke, as shown in Fig. 2, a spring, P, bearing against the opposite winding end of the latter, moves it to and holds it in position to cause engagement of the train-wheel H with the winding-wheel I.

Having thus described my invention, what I claim is—

1. As an improvement in stem winding and setting watches, in combination with the dial-wheels, and with a stem-driven train which is provided with a pivoted yoke, an intermediate wheel which is adapted to connect or to disconnect said dial-wheels and train, and by the movement of said yoke is shifted in a line perpendicular to its plane of rotation, substantially as and for the purpose specified.

2. As an improvement in stem winding and setting watches, in combination with the dial-wheels, and with a stem-driven train which is provided with a pivoted yoke, an intermediate wheel that is shiftable in a line perpendicular to its plane of rotation, and by the movement of said yoke is permitted to engage with or is disengaged from said dial-wheels and train, substantially as and for the purpose shown.

3. As an improvement in stem winding and setting watches, in combination with the dial-wheels, and with a stem-driven train which is provided with a pivoted yoke, an intermediate wheel that by the action of a spring is shifted in a line perpendicular to its plane of rotation into engagement with said dial-wheels and train, and by the motion of said yoke is shifted in the same line out of engagement with said parts, substantially as and for the purpose set forth.

4. As an improvement in stem winding and setting watches, a stem-driven train which is in part journaled upon a pivoted yoke, and an intermediate wheel that, by the movements of said yoke and the action of a spring, is shiftable in a line perpendicular to its plane of rotation, said parts being combined and arranged to operate in the order shown, whereby as said train is engaged with the spring-wheel it is automatically disengaged from the dial-wheels, and when engaged with said dial-wheels it is by the same operation disengaged from said winding-wheel, substantially as and for the purpose shown and described.

In testimony whereof I hereunto set my hand this 21st day of February, 1885.

DUANE H. CHURCH.

Witnesses:
C. F. BROWN,
R. J. POWERS.